(12) United States Patent
Lee et al.

(10) Patent No.: US 9,697,786 B2
(45) Date of Patent: Jul. 4, 2017

(54) DISPLAY DEVICE

(71) Applicant: LG DISPLAY CO., LTD., Seoul (KR)

(72) Inventors: Seeung Lee, Bucheon-si (KR); Chansoo Park, Seoul (KR); Seungseok Ryoo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 113 days.

(21) Appl. No.: 14/310,581

(22) Filed: Jun. 20, 2014

(65) Prior Publication Data
US 2014/0375534 A1     Dec. 25, 2014

(30) Foreign Application Priority Data

Jun. 25, 2013  (KR) ........................ 10-2013-0072928

(51) Int. Cl.
*G09G 3/36* (2006.01)
*G02F 1/1362* (2006.01)
*G02F 1/1345* (2006.01)

(52) U.S. Cl.
CPC ..... *G09G 3/3648* (2013.01); *G02F 1/136286* (2013.01); *G02F 2001/13456* (2013.01); *G02F 2001/136218* (2013.01); *G09G 2300/0426* (2013.01); *G09G 2310/0281* (2013.01); *G09G 2320/0223* (2013.01)

(58) Field of Classification Search
None
See application file for complete search history.

(56) References Cited

U.S. PATENT DOCUMENTS

| 2010/0066967 A1* | 3/2010 | Takahashi | G02F 1/136286 349/143 |
| 2011/0102309 A1* | 5/2011 | Cho | G09G 3/3648 345/92 |
| 2013/0113766 A1* | 5/2013 | Kim | G09G 3/3648 345/205 |
| 2013/0314636 A1* | 11/2013 | Chen | G02F 1/1343 349/43 |

FOREIGN PATENT DOCUMENTS

| CN | 102456333 A | 5/2012 |
| CN | 103137616 A | 6/2013 |
| CN | 103163671 A | 6/2013 |

OTHER PUBLICATIONS

Office Action dated Jul. 14, 2016 for Chinese Application No. 201410261636.1, 20 pages.

* cited by examiner

*Primary Examiner* — Seokyun Moon
(74) *Attorney, Agent, or Firm* — Brinks Gilson & Lione

(57) ABSTRACT

A display device includes a display panel having vertical lines and horizontal lines formed thereon; sub-pixels; and a driver supplying a data signal and a scan signal to the sub-pixels through the vertical lines and horizontal lines, the vertical lines include a vertical data line to which the data signal is supplied and a vertical scan line to which the scan signal is supplied, the horizontal lines are connected to the vertical scan line and include a horizontal scan line transferring the scan signal in a horizontal direction, and the display panel include a shield electrode for shielding a signal interference between the pixel electrode and the vertical scan line.

13 Claims, 10 Drawing Sheets

DISPLAY DEVICE

This application claims the benefit of priority to Korean Patent Application No. 10-2013-0072928 filed on Jun. 25, 2013, which is hereby incorporated by reference.

BACKGROUND

Field

The present disclosure relates to a display device.

Description of the Related Art

In accordance with the development of an information technology, the market for a display device, which is a connection a medium between a user and information, is expanding. Accordingly, use of a flat panel displays (FPD), such as liquid crystal displays (LCD), organic light emitting diode (OLED) displays, and plasma display panels (PDP), has been increasing.

Among the above-mentioned flat panel displays, the liquid crystal display that may achieve a high resolution and that may be manufactured as a large-sized display as well as a small-sized display has been widely used. The liquid crystal display displays an image by adjusting an arrangement direction of a liquid crystal layer in an electric field applied to a pixel electrode and a common electrode included in a liquid crystal panel so as to emit light irradiated from a backlight unit. The liquid crystal display is manufactured by being divided into various driving methods depending on a structure of the pixel electrode and the common electrode included in the liquid crystal panel.

All display panels as well as liquid crystal panels have a bezel region in which image is not displayed. A narrow bezel technology of minimizing the bezel region has been attempting by various methods. However, the narrow bezel technology proposed according to the related art has technical limitations for a fine process. Therefore, a need exists for improvements to these technical limitations.

SUMMARY

An aspect of the present invention provides a display device including: a display panel having vertical lines and horizontal lines formed thereon; sub-pixels formed on the display panel and including a pixel electrode and a common electrode; and a driver supplying a data signal and a scan signal to the sub-pixels through the vertical lines and horizontal lines, the vertical lines include a vertical data line to which the data signal is supplied and a vertical scan line to which the scan signal is supplied, the horizontal lines are connected to the vertical scan line and include a horizontal scan line transferring the scan signal in a horizontal direction, and the display panel include a shield electrode for shielding a signal interference between the pixel electrode and the vertical scan line.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings.

DETAILED DESCRIPTION OF EXAMPLARY EMBODIMENTS

Reference will now be made in detail embodiments of the invention examples of which are illustrated in the accompanying drawings.

Hereinafter, detailed embodiments according to an exemplary embodiment of the present invention will be described with reference to the accompanying drawings.

<First Embodiment>

Figure 1:
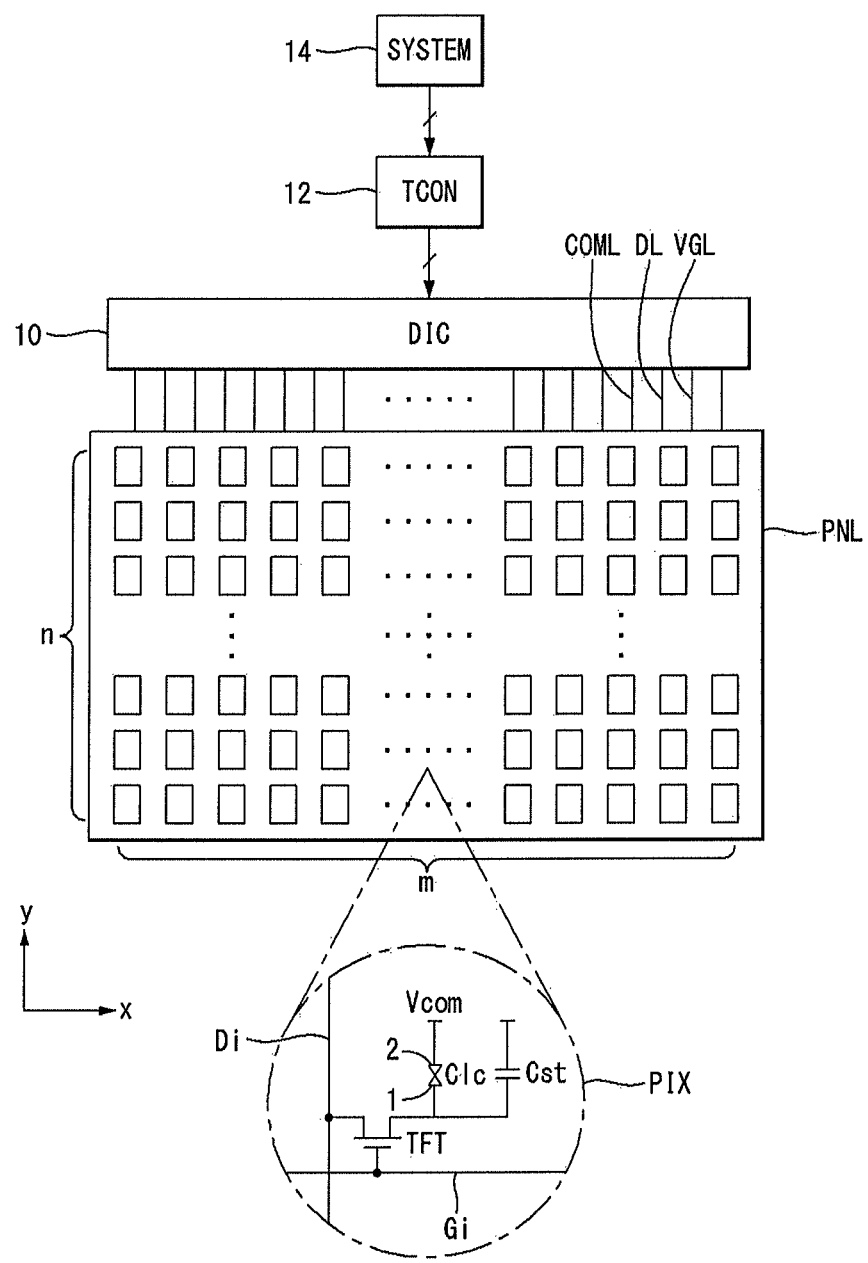
FIG. 1 is a schematic block configuration view of a display device according to a first embodiment of the present invention.
Figure 2:
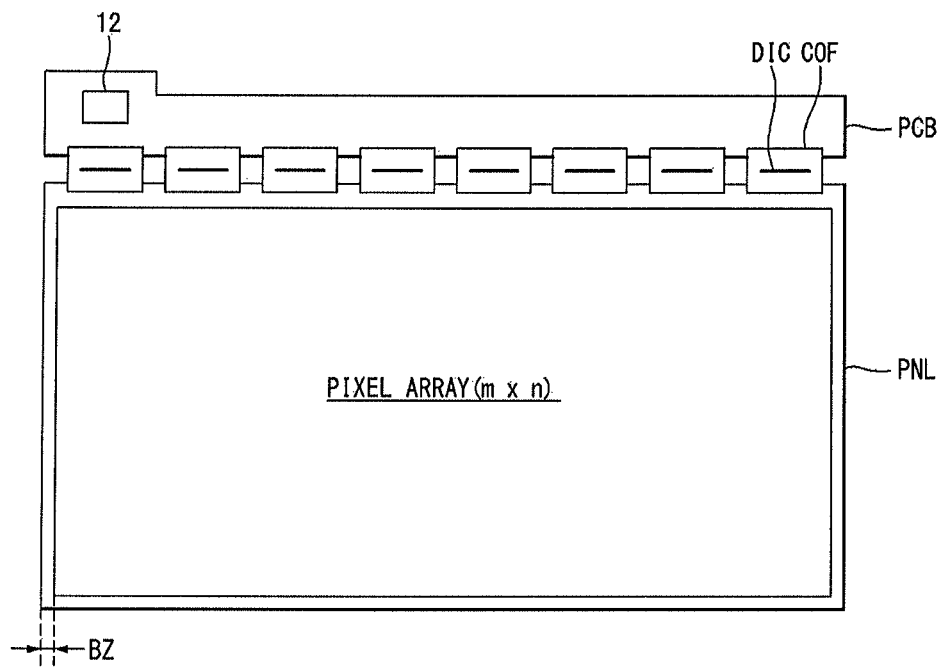
FIG. 2 is a configuration view of a display device that a portion of the block illustrated in FIG. 1 is modularized.
Figure 3:
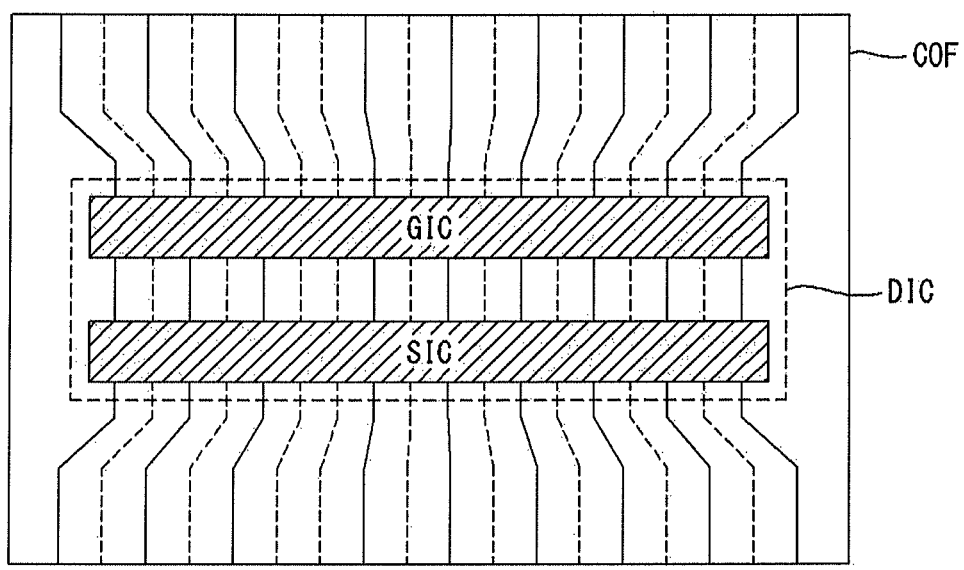
FIG. 3 is enlarged view of a chip on film (COF) illustrated in FIG. 2.

FIG. 1 is a schematic block configuration view of a display device according to a first embodiment of the present invention, FIG. 2 is a configuration view of a display device that a portion of the block illustrated in FIG. 1 is modularized, and FIG. 3 is enlarged view of a chip on film (COF) illustrated in FIG. 2.

Referring to FIGS. 1 to 3, the display device according to a first embodiment of the present invention includes a display panel PNL, a driver DIC 10, a timing controller TCON 12, a host system SYSTEM 14, and the like.

The host system SYSTEM 14 converts a digital video data of an input image into a format suitable for the display panel PNL. The host system SYSTEM 14 supplies timing signals (Vsync, Hsync, DE, MCLK, and the like) together with the digital video data of the input image to the timing controller TCON 12.

The timing controller TCON 12 supplies the digital video data of the input image supplied from the host system 14 to the driver 10. The timing controller 12 receives the timing signals such as a vertical synchronization signal (Vsync), a horizontal synchronization signal (Hsync), a data enable signal (DE), a main clock (MCLK), and the like from the host system 14. The timing controller 12 generates a source timing control signal and a gate timing control signal to control the driver 10 using the timing signals such as the Vsync, Hsync, DE, and CLK.

The display panel PNL may be implemented by depositing a thin film, such as the liquid crystal display panel, the organic light emitting display panel, an electrophoretic display panel, an the like However, for the convenience of description, the liquid crystal display panel PNL as an example of the display panel PNL will be described below. The liquid crystal display panel PNL may be implemented in all known liquid crystal modes such as a twisted nematic (TN) mode, a vertical alignment (VA) mode, an in plane switching (IPS) mode, a fringe field switching (FFS) mode, or the like. In addition, the liquid crystal display panel PNL may also be implemented in any forms, such as a transmissive liquid crystal display device, a transflective liquid crystal display device, a reflective liquid crystal display device, and the like.

The liquid crystal display panel PNL includes sub-pixels formed between an upper substrate and a lower substrate disposed to face each other, having a liquid crystal cell Clc therebetween. The liquid crystal display panel PNL includes an alignment film formed on the upper and lower substrates thereof, wherein the alignment layer sets a pre-tilt angle of the liquid crystal. The liquid crystal display panel PNL includes a polarizing plate attached to an external surface of the upper and lower substrates thereof.

The liquid crystal display panel PNL includes vertical lines DL, VGL, and COML and horizontal lines Gi formed in the lower substrate thereof. The vertical lines DL, VGL, and COML are formed in a vertical direction (a y axis direction) of the liquid crystal display panel PNL, and the horizontal lines Gi are formed in a horizontal direction (an x axis direction) of the liquid crystal display panel PNL. Further, the vertical lines and the horizontal lines are disposed to intersect with each other.

The vertical lines DL, VGL and COML indicate a vertical data line DL, a vertical scan line VGL and a vertical common voltage line COML, and the horizontal lines Gi indicate a horizontal scan line Gi. Meanwhile, the horizontal lines Gi further include a horizontal common voltage line which is connected to the vertical common voltage line COML, but it is not shown.

The vertical data line DL, the vertical scan line VGL and the vertical common voltage line COML transfer a data signal, a scan signal, and a common voltage in the vertical direction (the y axis direction), respectively. The horizontal scan line Gi changes the direction of the scan signal which is transferred in the vertical direction (the y axis direction) by the vertical scan line VGL into the horizontal direction (the x axis direction) to transfer the scan signal.

The liquid crystal display panel PNL includes a black matrix and a color filter formed in the upper substrate thereof. The black matrix is formed on the outside of the upper substrate according to a structure of the liquid crystal display panel PNL or may be omitted when a construction of performing the same role as it exists thereon. The color filter is formed in the upper or lower substrate according to the structure of the liquid crystal display panel PNL.

The liquid crystal display panel PNL is defined as a pixel array of sub-pixels corresponding to a display region and a bezel region BZ corresponding to the non-display region. The sub-pixels are arranged in a matrix form of m*n in a region in which the vertical data line Di and the horizontal scan line Gi intersect with each other. One sub-pixel PIX includes a thin film transistor TFT, a liquid crystal cell Clc, a storage capacitor Cst, a pixel electrode 1, and a common electrode 2. The thin film transistor TFT allows the gate electrode to be connected to the horizontal scan line Gi, the first electrode to be connected to the vertical data line Di, and the second electrode to be connected to the pixel electrode 1.

The driver DIC 10 includes a data driver SIC and a scan driver GIC. The driver 10 is formed in an integrated circuit (IC) form and is mounted in a chip on film COF manner on a flexible printed circuit board (FPCB). An input terminal of the COF is connected to a printed circuit board (PCB) and an output terminal of the COF is connected to the lower substrate of the liquid crystal display panel PNL. In the COF, an insulating film is formed therebetween so that the lines (shown as a dot line in FIG. 3) connected to the data driver SIC and the lines (shown as a solid line in FIG. 3) connected to the scan driver GIC are electrically separated from each other.

The data driver SIC latches after sampling the digital video data of the input image under controlling of the timing controller TCON 12 to convert the latched data into data of a parallel data system. In this case, the data driver SIC converts the digital video data into an analog gamma compensation voltage using a digital to analog converter (ADC) to generate a data voltage. Further, the data driver SIC supplies the generated data voltage to the vertical data line DL. The scan driver GIC sequentially supplies a scan signal (a gate pulse or a scan pulse) which is synchronized with the data voltage to the first vertical scan line up to the n-th vertical scan line under controlling of the timing controller TCON 12.

Meanwhile, although a case in which the data driver SIC and the scan driver GIC are mounted in the COF manner is described as an example in the first embodiment, the scan driver GIC may also be formed in a thin film form by a gate in panel (GIP) process. However, if the driver 10 is formed in the COF which is mounted on the liquid crystal display panel PNL and connected to the PCB, and is configured so that the scan signal is supplied to the horizontal scan line Gi via the vertical scan line VGL, the following advantages may have. First, a separate space for forming the scan driver GIC and a separate flexible printed circuit board for mounting the scan driver GIC are not required. Second, a line routing may be minimized in order to electrically connect the scan driver GIC to the liquid crystal display panel PNL, and the number of lines that exist in the bezel region BZ may be minimized. As a result, a narrow bezel that minimizes the space (or width) corresponding to the bezel region BZ in the liquid crystal display panel PNL may be implemented.

Hereinafter, the pixel array included in the liquid crystal display panel will be described below.

Figure 4:
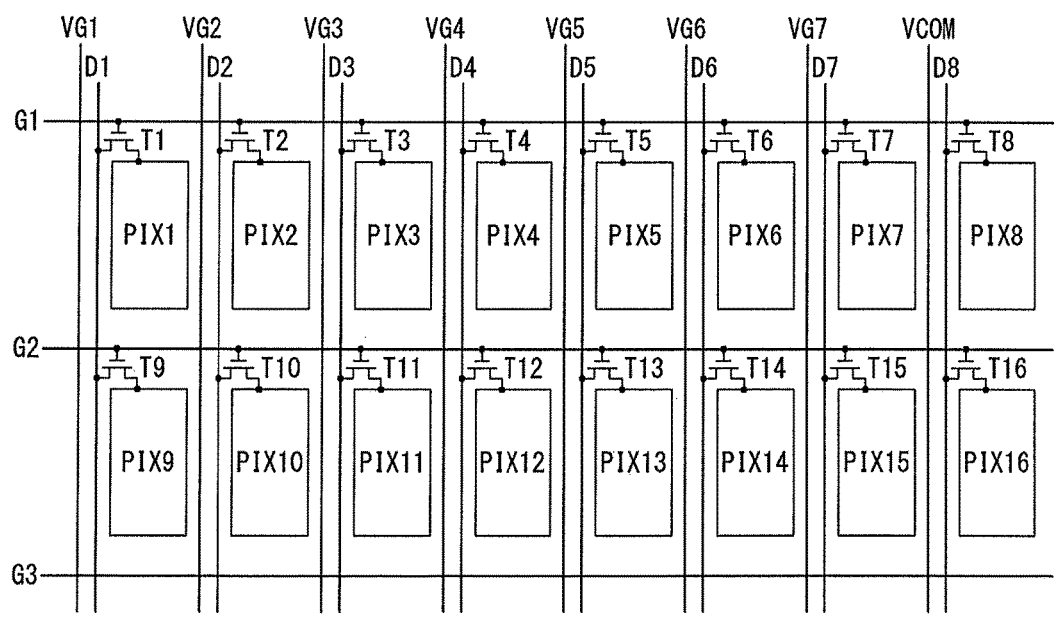
FIG. 4 is a first exemplified view of a pixel array.
Figure 5:
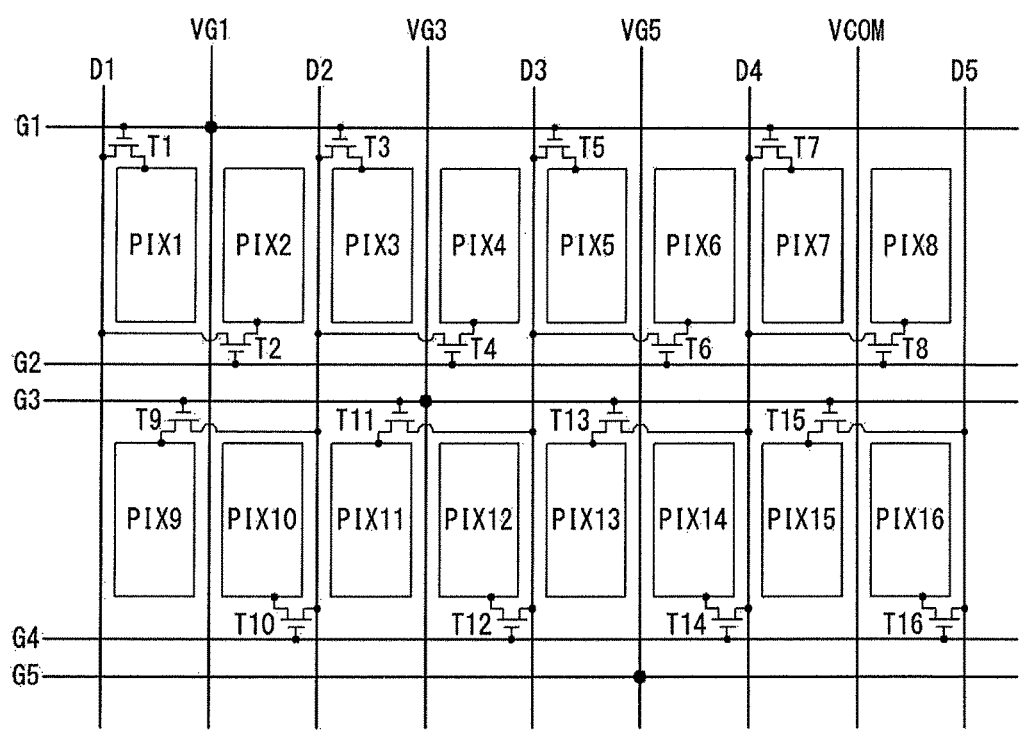
FIG. 5 is a second exemplified view of a pixel array.
Figure 6:
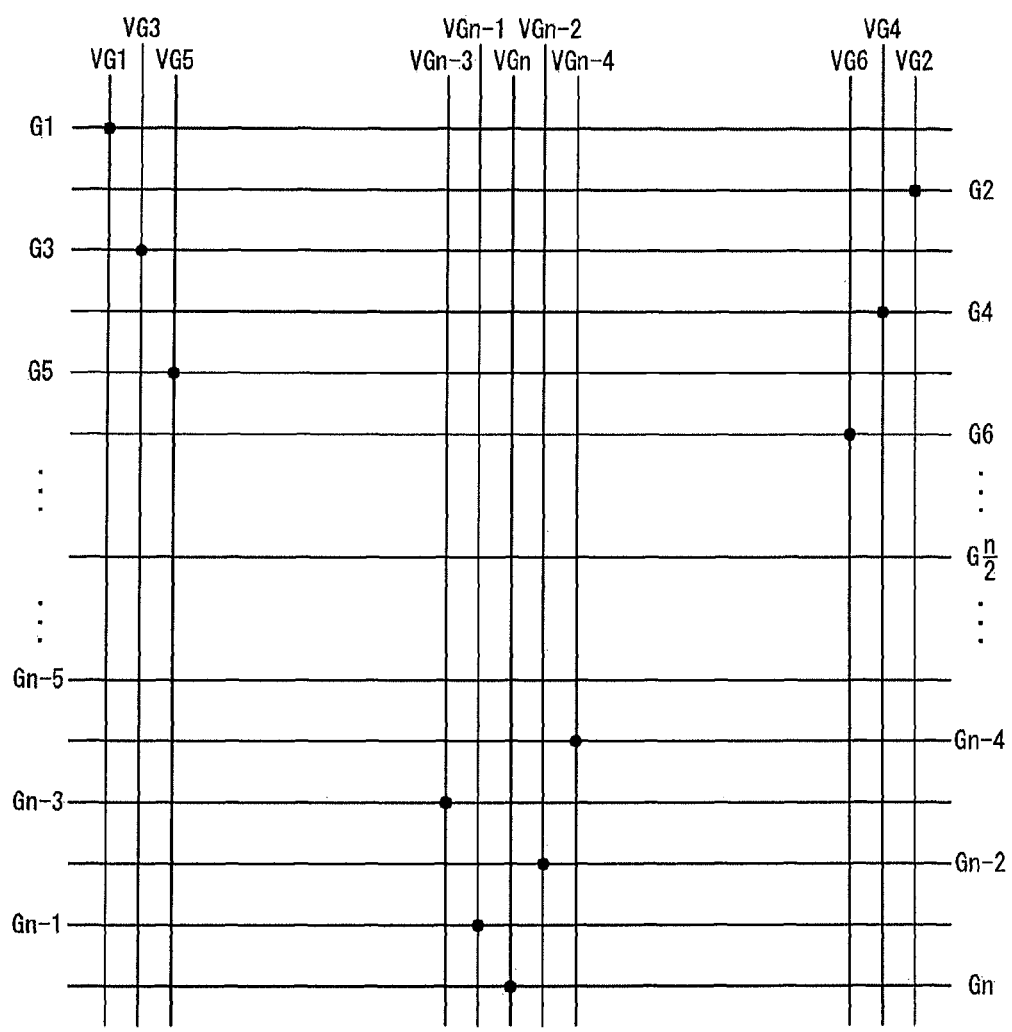
FIG. 6 is a view illustrating a connection relationship between vertical scanning lines and horizontal scanning lines.

FIG. 4 is a first exemplified view of the pixel array, FIG. 5 is a second exemplified view of the pixel array, and FIG. 6 is a view illustrating a connection relationship between the vertical scan lines and the horizontal scan lines.

As shown in FIG. 4, the first to seventh vertical scan lines VG1 to VG7, the first to eighth vertical data lines D1 to D8, and the common voltage line VCOM are wired in the vertical direction, and the first to third horizontal scan lines G1 to G3 are wired.

Each of the sub-pixels PIX1 to PIX16 is defined by one vertical data line, one vertical scan line, and one horizontal scan line. Further, the thin film transistors T1 to T16 included in each of the sub-pixel PIX1 to PIX16 are connected to the horizontal scan line and the vertical data line disposed at an upper intersection of each of the sub-pixel PIX1 to PIX16. That is, the thin film transistors T1 to T16 are disposed in the same way as a top (or a bottom) over all the lines.

Referring to the lines wired both between the first and second sub-pixels PIX1 and PIX2, and between the sixth and seventh sub-pixels PIX6 and PIX7, one vertical data line and one vertical scan line are wired so as to pass between the sub-pixels adjacent in right and left direction. However, referring to the line wired between the seventh and eighth sub-pixels PIX7 and PIX8, the common voltage line VCOM may be wired to be included between the sub-pixels adjacent in the right and left direction. Referring to the line wired between the firth and ninth sub-pixels PIX1 and PIX9, one horizontal scan line is wired so as to pass between the sub-pixels adjacent in an up and down direction.

According to the line routing method and the thin film transistor disposition method as described above, the first sub-pixel PIX1 is defined by the first vertical data line D1, the first vertical scan line VG1, and the first horizontal scan line G1. Further, the first thin film transistor T1 included in the first sub-pixel PIX1 is connected to the first vertical data line D1 and the first horizontal scan line G1. In addition, the second to sixteenth sub pixels PIX2 to PIX16 are defined by the lines passing in the vertical and horizontal directions and are connected to the lines disposed at the intersection thereof.

As shown in FIG. 5, the first to third vertical scan lines VG1 to VG3, the first to fifth vertical data lines D1 to D5, and the common voltage line VCOM are wired in the vertical direction, and the first to fifth horizontal scan lines G1 to G5 are wired.

Each of the sub-pixels PIX1 to PIX16 is defined by one vertical data line, one vertical scan line, and one horizontal scan line. Further, the thin film transistors T1 to T16 included in each of the sub-pixel PIX1 to PIX16 are connected to the horizontal scan line and the vertical data line disposed at the upper or lower intersection of each of the sub-pixel PIX1 to PIX16. That is, the thin film transistors T1 to T16 are alternately disposed at the top and bottom for each line.

Referring to the lines wired both between the first and second sub-pixels PIX1 and PIX2, and between the sixth and seventh sub-pixels PIX6 and PIX7, one vertical data line or one vertical scan line is wired so as to pass between the sub-pixels adjacent in the right and left direction. However, referring to the line wired between the seventh and eighth sub-pixels PIX7 and PIX8, the common voltage line VCOM may be wired to be included between the sub-pixels adjacent in the right and left direction. Referring to the line wired between the firth and ninth sub-pixels PIX1 and PIX9, one or two horizontal scan lines are wired so as to pass between the sub-pixels adjacent in the up and down direction. The region in which one horizontal scan line is wired may be defined as the uppermost or undermost region of the liquid crystal display panel, and the region in which two horizontal scan lines is wired may be defined as an inner region of the uppermost or undermost region of the liquid crystal display panel.

According to the line routing method and the thin film transistor disposition method as described above, the first sub-pixel PIX1 is defined by the first vertical data line D1 disposed at the left side thereof, the first vertical scan line VG1 disposed at the right side thereof, and the first horizontal scan line G1 disposed at the top thereof. Further, the first thin film transistor T1 included in the first sub-pixel PIX1 is connected to the first vertical data line D1 disposed at the left side thereof and the first horizontal scan line G1 disposed at the top thereof. On the other hand, the second sub-pixel PIX2 adjacent to the first sub-pixel PIX1 is defined by the first vertical scan line VG1 disposed at the left side thereof, the second vertical data line D2 disposed at the right side thereof, and the second horizontal scan line G2 disposed at the bottom thereof. Further, the second thin film transistor T2 included in the second sub-pixel PIX2 is connected to the first vertical data line D1 disposed at the left side thereof and the second horizontal scan line G2 disposed at the bottom thereof. In addition, the third to eighth sub pixels PIX3 to PIX18 are defined by the lines passing in the vertical and horizontal directions and are connected to the lines disposed at the intersection thereof.

According to the line routing method and the thin film transistor disposition method as described above, the ninth sub-pixel PIX9 is defined by the first vertical data line D1 disposed at the left side thereof, the first vertical scan line VG1 disposed at the right side thereof, and the third horizontal scan line G3 disposed at the top thereof. Further, the ninth thin film transistor T9 included in the ninth sub-pixel PIX9 is connected to the second vertical data line D2 disposed at the right side thereof and the third horizontal scan line G3 disposed at the top thereof. On the other hand, the tenth sub-pixel PIX10 adjacent to the ninth sub-pixel PIX9 is defined by the first vertical scan line VG1 disposed at the left side thereof, the second vertical data line D2 disposed at the right side thereof, and the fourth horizontal scan line G4 disposed at the bottom thereof. Further, the tenth thin film transistor T10 included in the tenth sub-pixel PIX10 is connected to the second vertical data line D2 disposed at the right side thereof and the fourth horizontal scan line G4 disposed at the bottom thereof. In addition, the eleventh to sixteenth sub pixels PIX11 to PIX16 are defined by the lines passing in the vertical and horizontal directions and are connected to the lines disposed at the intersections thereof.

In the first embodiment, a disposition relationship of the vertical lines including the vertical data lines D1 to D8, the vertical scan lines VG1 to VG7, and the vertical common voltage line VCOM and the horizontal lines including the horizontal scan lines G1 to G5 have been described with reference to the pixel array shown in FIGS. 4 and 5. However, the disposition relationship between the vertical and horizontal lines may be variously changed in design according to the structure of the sub-pixel configuring the pixel array, but is not limited thereto.

Meanwhile, the structure using the vertical and horizontal scan lines may have the resistance higher than that of the structure of the scan line according to the related art. In consideration of the above aspects, in order to reduce RC (herein, R is resistance and C is capacitance) delay and to compensate charge loss of the data voltage, positions which the horizontal scan lines and the horizontal san lines are connected to each other may be formed as shown in FIG. 6. The portion shown as a dot line in FIG. 6 means a contact hole that serves to electrically connect the horizontal scan line to the horizontal scan line.

In detail, the vertical scan lines VG1, VG3, . . . VGn-1 disposed at the left side of the liquid crystal display panel PNL are connected to an odd-numbered horizontal scan lines G1, G3, . . . Gn-1, respectively, and the vertical gate lines VG2, VG4, . . . VGn disposed at the right side of the liquid crystal display panel PNL are connected to an even-numbered horizontal scan lines G2, G4, . . . Gn, respectively. The contact holes for electrically connecting the vertical scan lines VG1, VG2, . . . VGn to the horizontal scan lines G1, G2, . . . Gn may be positioned closely at the center of the liquid crystal display panel PNL as distance from the driver increases. Therefore, when the contact holes for electrically connecting the vertical scan lines VG1, VG2, . . . VGn to the horizontal scan lines G1, G2, . . . Gn are connected by a virtual line, it is possible to have a V-shape.

Hereinafter, a cross-sectional structure and plane structure of the sub-pixel will be described with reference to FIGS. 7 to 9.

Figure 7:
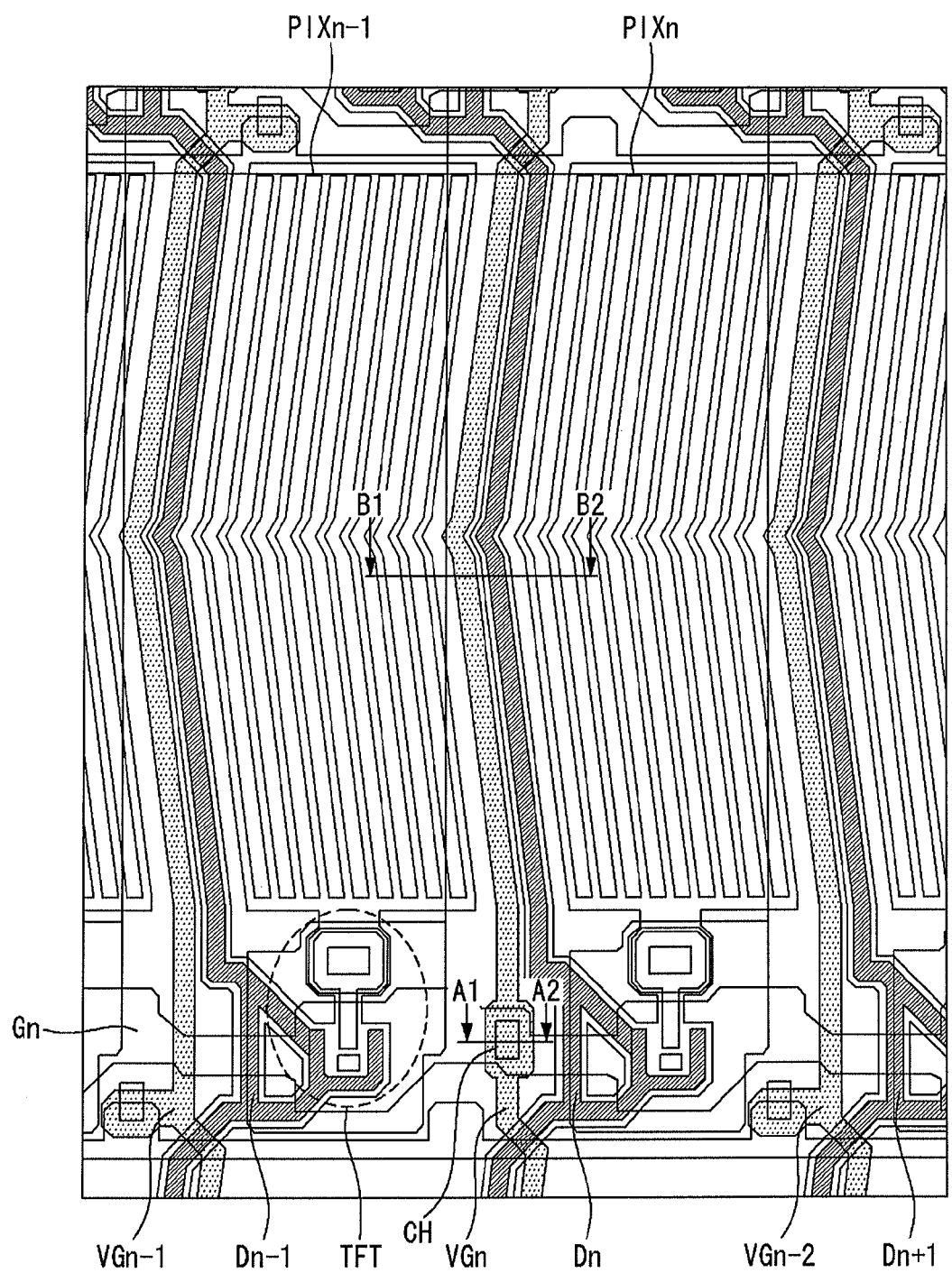
FIG. 7 is a plan view illustrating a sub-pixel according to a first embodiment of the present invention.
Figure 8:
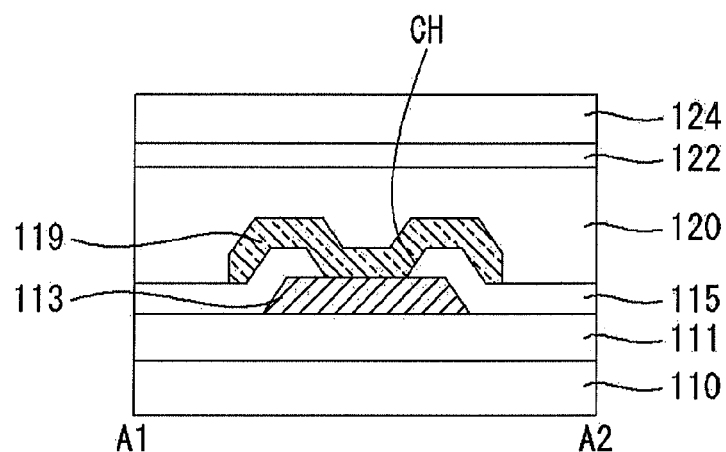
FIG. 8 is a cross-sectional view of a region taken along line A1-A2 illustrated in FIG. 7.
Figure 9:
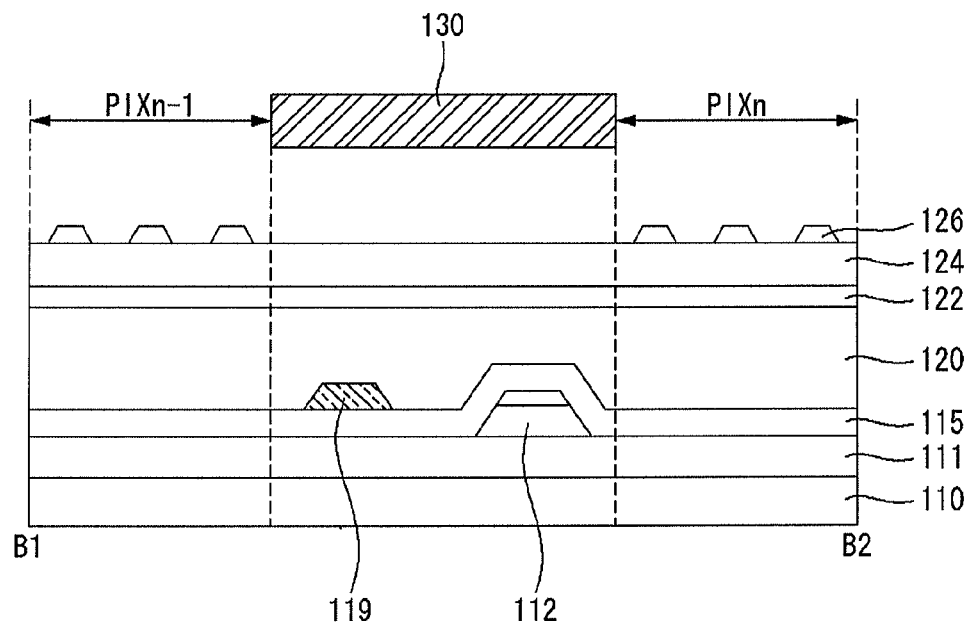
FIG. 9 is a cross-sectional view of a region taken along line B1-B2 illustrated in FIG. 7.

FIG. 7 is a plan view illustrating a sub-pixel according to a first embodiment of the present invention, FIG. 8 is a cross-sectional view of a region taken along line A1-A2 illustrated in FIG. 7, and FIG. 9 is a cross-sectional view of a region taken along line B1-B2 illustrated in FIG. 7.

As shown in FIG. 7, 1n-1 sub-pixel PIXn-1 and n sub-pixel PIXn represent the structure formed based on the pixel array shown in FIG. 4. As set forth above, the 1n-1 sub pixel PIXn-1 is defined by n-1 vertical data line Dn-1, n-1 vertical scan line VGn-1, and n horizontal scan line Gn. Further, the n sub-pixel PIXn is defined by the n vertical data line Dn, the n vertical scan line VGn, and the n horizontal scan line Gn. The n-1 vertical data line Dn-1 and n-1 vertical scan line VGn-1 and the n vertical data line Dn and n vertical scan line VGn may be wired to make pairs.

The n vertical data line Dn and the n vertical scan line VGn are disposed in a vertical space vertically dividing a region between the 1n-1 sub-pixel PIXn-1 and the n sub-pixel PIXn. The n horizontal scan line Gn is disposed in a horizontal space horizontally dividing a region between the 1n-1 sub pixel PIXn-1 or the n sub-pixel PIXn and the sub-pixels that exist in a next line. The n vertical data line Dn and the n horizontal scan line Gn are electrically connected by the contact hole CH disposed in the vertical space vertically dividing the region between the 1n-1 sub-pixel PIXn-1 and the n sub-pixel PIXn. Since the thin film transistor TFT included in the 1n-1 sub-pixel PIXn-1 and the n sub-pixel PIXn may be formed in the various methods, the detailed description thereof replaces with the above-mentioned electrical connection relationship, and the structural description thereof will be omitted.

Meanwhile, at the time of forming the vertical scan line as described above, when signal interference between the pixel electrode and the vertical scan line occurs, a parasitic capacitance between the pixel electrode and the vertical scan line is formed. When the parasitic capacitance between the pixel electrode and the vertical scan line is formed, the vertical space becomes dark compared with other region and thus, a dim phenomenon in a vertical direction is generated.

In the first embodiment of the present invention, in order to remove or improve the vertical direction dim, a shield electrode for shielding the signal interference between the pixel electrode and the vertical scan line is formed in the vertical space in which the vertical scan line is formed. The method of forming the shield electrode is as follows.

[Cross-Sectional Structure of a Region Taken Along Line A1-A2]

As shown in FIGS. 7 and 8, a first insulating film 111 is formed on the lower substrate 110. The first insulating film 111 may be made of a silicon oxide film SiOx or a silicon nitride film SiNx. The horizontal scan line 113 disposed in the vertical space is formed on the first insulating film 111. The horizontal scan line 113 may be at least one selected from a group consisting of molybdenum (Mo), aluminum (Al), chrome (Cr), gold (Au), titanium (Ti), nickel (Ni), and copper (Cu), or an alloy thereof. Further, the horizontal scan line 113 may be formed of the single layer or the multi-layer. The horizontal scan line 113 corresponds to Gn of FIG. 7.

A second insulating film 115 is formed on the horizontal scan line 113. The second insulating film 113 may be made of a silicon oxide film SiOx or a silicon nitride film SiNx.

The contact hole CH exposing a portion of the horizontal scan line 113 disposed in the vertical space is formed on the second insulating film 113.

The vertical scan line 119 disposed in the vertical space is formed on the second insulating film 113. The vertical scan line 119 may be at least one selected from a group consisting of molybdenum (Mo), aluminum (Al), chrome (Cr), gold (Au), titanium (Ti), nickel (Ni), and copper (Cu), or an alloy thereof. Further, the horizontal scan line 113 may be formed of the single layer or the multi-layer. The vertical scan line 119 is electrically connected with the horizontal scan line 113 formed at the lower portion thereof through the contact hole CH disposed in the vertical space. The vertical scan line 119 corresponds to VGn of FIG. 7.

A third insulating film 120 is formed on the vertical scan line 119. The third insulating film 120 is selected in an organic film, an inorganic film, or an organic-inorganic composite film, capable of planarizing a surface such as polyacryl. A transparent electrode 122 is formed on the third insulating film 120. The transparent electrode 122 may be made of a transparent conductive film such as indium tin oxide (ITO), indium zinc oxide (IZO), indium tin zinc oxide (ITZO), zinc oxide (ZnO), indium gallium zinc oxide (IGZO), grapheme, or the like. The transparent electrode 122 serves as he common electrode and the shield electrode. That is, the transparent electrode 122 is the common electrode which is formed integrally with the shield electrode. Therefore, a common voltage is supplied to the transparent electrode 122. A fourth insulating film 124 is formed on the transparent electrode 122. The fourth insulating film 124 may be made of a silicon oxide film SiOx or a silicon nitride film SiNx.

[Cross-Sectional Structure of a Region Taken Along Line B1-B2]

As shown in FIGS. 7 and 9, a first insulating film 111 is formed on the lower substrate 110. The vertical data line 112 disposed in the vertical space is formed on the first insulating film 111. The second insulating film 115 is formed on the vertical data line 112. The vertical scan line 119 disposed in the vertical space is formed on the second insulating film 115. The third insulating film 120 is formed on the vertical scan line 119. The transparent electrode 122 is formed on the third insulating film 120. The transparent electrode 122 is formed over entire surface of the third insulating film 120. The transparent electrode 122 serves as he common electrode and the shield electrode. The fourth insulating film 124 is formed on the transparent electrode 122. The pixel electrodes 126 are formed on the third insulating film 124.

The pixel electrodes 126 are separately disposed in the region of the n-1 and n sub-pixels PIXn-1 and PIXn. The pixel electrode 126 may be configured to be divided into a plurality of pixel electrodes so as to have a (<) shape in a transmission region as shown in FIG. 7. In this case, the n-1 vertical data line Dn-1 and n-1 vertical scan line VGn-1 and the n vertical data line Dn and n vertical scan line VGn may be wired so as to have the (<) shape. However, it is only an example and the shapes thereof are not limited thereto. Meanwhile, as the reference numeral 130 represents a black matrix formed on the upper substrate, a width of the vertical space may correspond to the width of the black matrix 130 in the vertical direction.

Hereinafter, the signal interference between the pixel electrode and the vertical scan line will be described below with reference to the drawings of the comparative example and first embodiment.

Figure 10A:
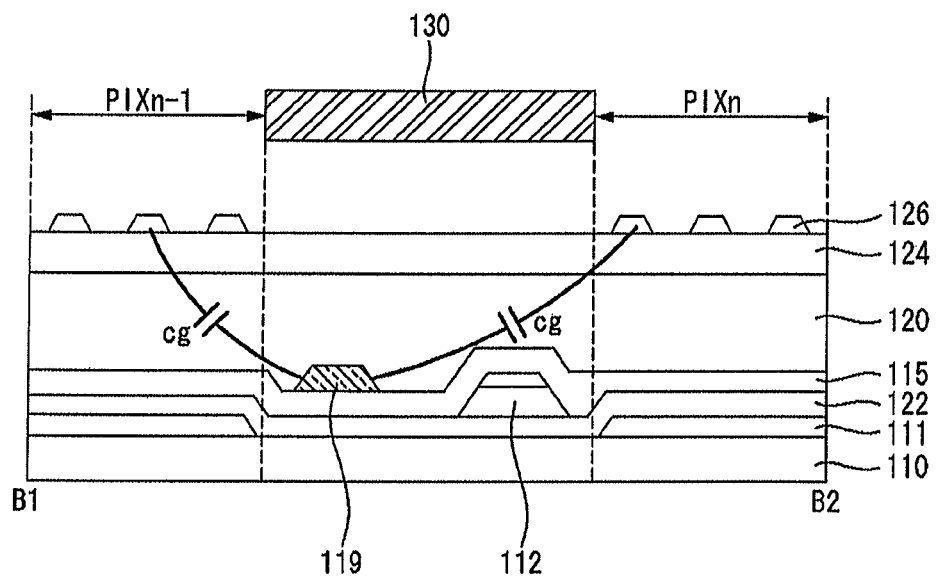
FIGS. 10a and 10b are cross-sectional views for comparing explaining a comparative example and a first embodiment.
Figure 10B:
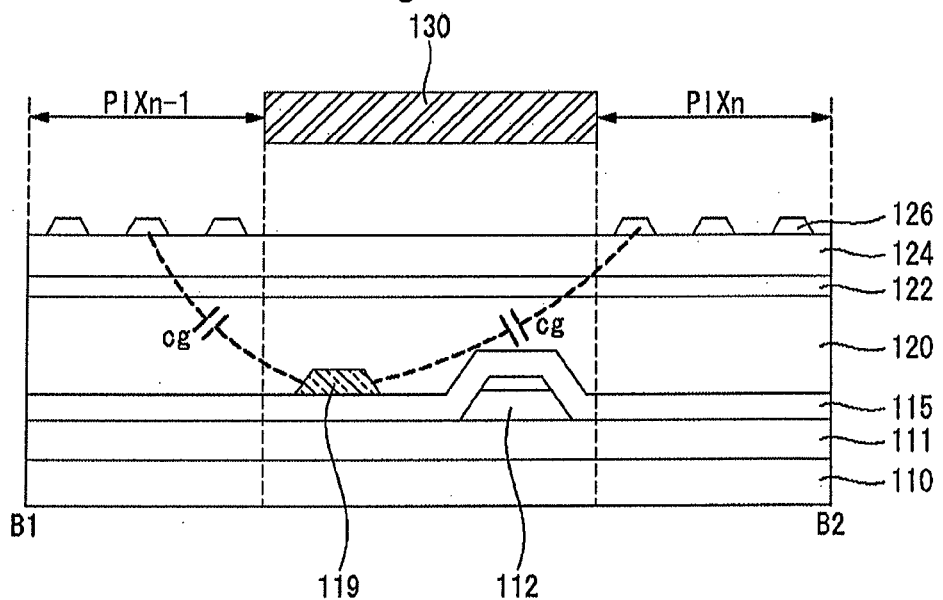

FIGS. 10a and 10b are cross-sectional views for comparing explaining a comparative example and a first embodiment.

The comparative example shown in FIG. 10A has a structure similar to those of the first embodiment shown in FIG. 10B except that the transparent electrode 122 is formed on the lower substrate 110 and the shield electrode does not exist between the vertical scan line 119 and the pixel electrode 126.

with the comparative example (a), the shield electrode does not exist between the vertical scan line 119 and the pixel electrode 126. In this case, when the liquid crystal display panel is driven, the parasitic capacitance Cg is formed by the signal interference between the vertical scan line 119 and the pixel electrode 126. As described above, when the parasitic capacitance between the pixel electrode 126 and the vertical scan line 119 is formed, the vertical space becomes dark compared with other region and thus, the dim phenomenon in a vertical direction is generated.

On the other hand, with the first embodiment (b), the transparent electrode 122 to serve as the shield electrode is formed between the vertical scan line 119 and the pixel electrode 126. In this case, when the liquid crystal display panel is driven, the signal interference between the vertical scan line 119 and the pixel electrode 126 is shielded by the common voltage which is applied to the transparent electrode 122, such that the parasitic capacitance Cg is not formed and an occurrence of parasitic capacitance is suppressed. Therefore, with the first embodiment (b), the parasitic capacitance Cg is not formed and the occurrence of parasitic capacitance is suppressed, thereby making it possible to improve or prevent the dim phenomenon in the vertical direction. In the case using the structure such as the first embodiment (b), the signal interference between the vertical scan line 119 and the pixel electrode 126 is shielded, thereby making it possible to adopt a driving system that supplies to overlap the scan signal.

Meanwhile, a stacked structure of the liquid crystal display panel is not limited to the structure as described above and may be variously implemented. Hereinafter, the embodiment of the present invention will be described by dividing for each cross-sectional structure of the sub-pixel.

<Second Embodiment>

Figure 11:
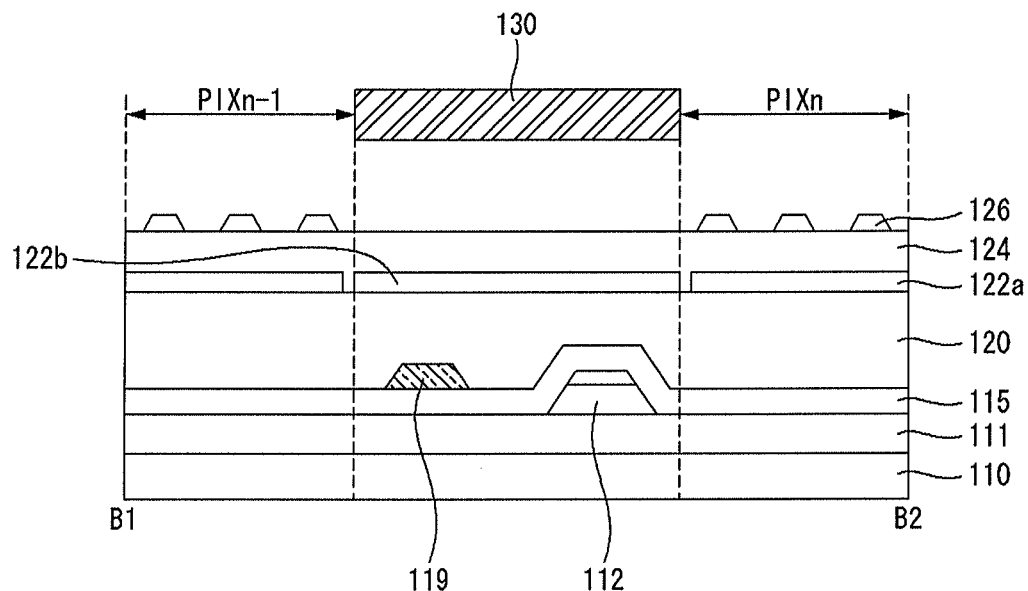
FIG. 11 is a cross-sectional view of a region taken along line B1-B2 illustrated in FIG. 7 according to a second embodiment of the present invention.

FIG. 11 is a cross-sectional view of a region taken along line B1-B2 illustrated in FIG. 7 according to a second embodiment of the present invention.

As shown in FIGS. 7 and 11, a first insulating film 111 is formed on the lower substrate 110. The vertical data line 112 disposed in the vertical space is formed on the first insulating film 111. The second insulating film 115 is formed on the vertical data line 112. The vertical scan line 119 disposed in the vertical space is formed on the second insulating film 115. The third insulating film 120 is formed on the vertical scan line 119. A first transparent electrode 122a and a second transparent electrode 122b are separated and formed on the third insulating film 120. The first transparent electrode 122a is formed to be separately disposed in the region of the sub-pixels and it becomes the common electrode. The second transparent electrode 122b is formed to be disposed in the vertical space, and it becomes the shield electrode. The second transparent electrode 122b which serves as the shield electrode is connected to the line for supplying the ground voltage or the voltage between the positive and negative voltages. The fourth insulating film 124 is formed on the first and second transparent electrodes 122a and 122b. The pixel electrodes 126 are formed on the fourth insulating film 124.

The pixel electrodes 126 are separately disposed in the region of the n-1 and n sub-pixels PIXn-1 and PIXn. The pixel electrode 126 may be configured to be divided into a plurality of pixel electrodes so as to have the (<) shape in the transmission region as shown in FIG. 7. In this case, the n-1 vertical data line Dn-1 and n-1 vertical scan line VGn-1 and the n vertical data line Dn and n vertical scan line VGn may be wired so as to have the (<) shape. However, it is only an example and the shapes thereof are not limited thereto. Meanwhile, as the reference numeral 130 represents a black matrix formed on the upper substrate, a width of the vertical space may correspond to the width of the black matrix 130 in the vertical direction.

Meanwhile, in the second embodiment, the first transparent electrode 122a which serves as the common electrode and the second transparent electrode 122b which serves as the shield electrode are formed to be electrically separated from each other. The common voltage supplied to the common electrode may swing in the positive and negative voltages according to a driving type (for example, a line inversion type) of the liquid crystal display panel. In this case, when the shield electrode and the common electrode are formed integrally as described in the first embodiment, it may not perform the shielding capability. Therefore, the second embodiment may apply to the structure in which the common voltage swings such as the line inversion type.

<Third Embodiment>

Figure 12:
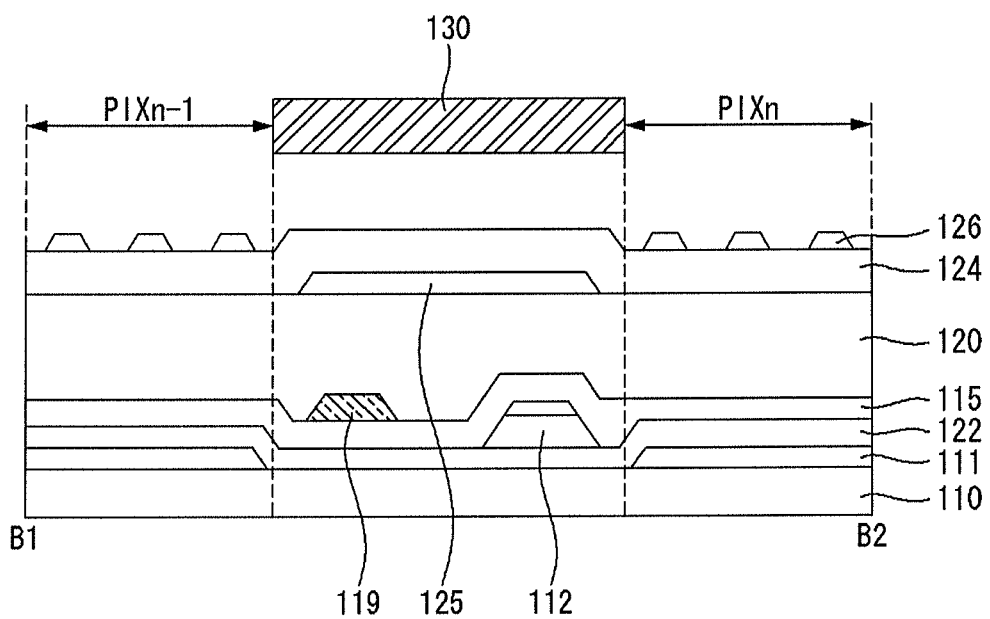
FIG. 12 is a cross-sectional view of a region taken along line B1-B2 illustrated in FIG. 7 according to a third embodiment of the present invention.

FIG. 12 is a cross-sectional view of a region taken along line B1-B2 illustrated in FIG. 7 according to a third embodiment of the present invention.

As shown in FIGS. 7 and 12, the transparent electrode 122 which are separately disposed in the region of the n-1 and n sub-pixels PIXn-1 and PIXn to become the common electrode are formed on the lower substrate 110.

The first insulating film 111 is formed on the transparent electrode 122. The vertical data line 112 disposed in the vertical space is formed on the first insulating film 111. The second insulating film 115 is formed on the vertical data line 112. The vertical scan line 119 disposed in the vertical space is formed on the second insulating film 115. The third insulating film 120 is formed on the vertical scan line 119. The shield electrode 125 disposed in the vertical space is formed on the third insulating film 120. The shield electrode 125 is connected to the line for supplying the ground voltage or the voltage between the positive and negative voltages. The fourth insulating film 124 is formed on the shield electrode 125. The pixel electrodes 126 are formed on the fourth insulating film 124.

The pixel electrodes 126 are separately disposed in the region of the n-1 and n sub-pixels PIXn-1 and PIXn. The pixel electrode 126 may be disposed to be divided into a plurality of pixel electrodes so as to have a (<) shape in th transmission region as shown in FIG. 7. In this case, the n-1 vertical data line Dn-1 and n-1 vertical scan line VGn-1 and the n vertical data line Dn and n vertical scan line VGn may be wired so as to have the (<) shape. However, it is only an example and the shapes thereof are not limited thereto. Meanwhile, as the reference numeral 130 represents a black matrix formed on the upper substrate, a width of the vertical space may correspond to the width of the black matrix 130 in the vertical direction.

Further, in the third embodiment, the transparent electrode, which becomes the common electrode, and the shield electrode 125 are formed to be separated in layers different from each other. The structure is to apply the shield electrode 125 to the comparative example shown in FIG. 10A <Fourth Embodiment>

Figure 13:
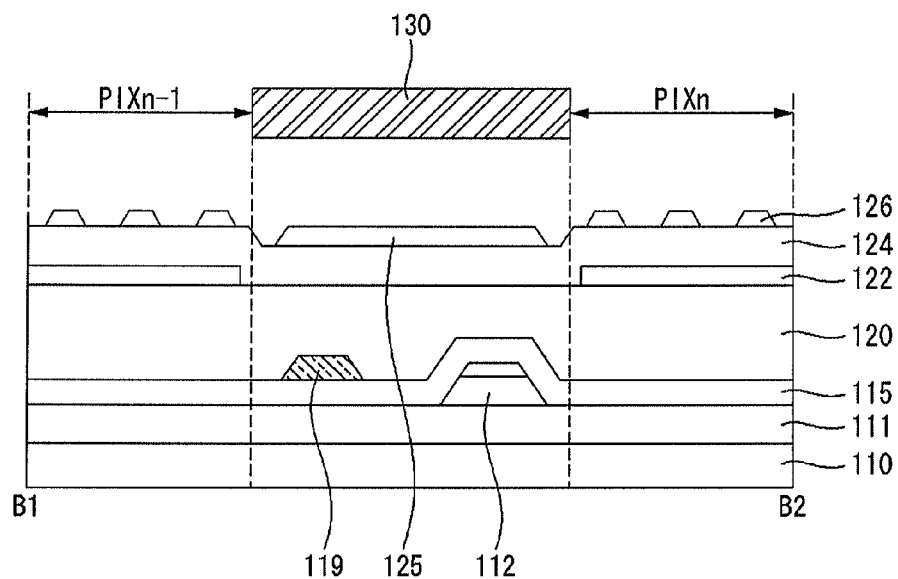
FIG. 13 is a cross-sectional view of a region taken along line B1-B2 illustrated in FIG. 7 according to a fourth embodiment of the present invention.

FIG. 13 is a cross-sectional view of a region taken along line B1-B2 illustrated in FIG. 7 according to a fourth embodiment of the present invention.

As shown in FIGS. 7 and 13, a first insulating film 111 is formed on the lower substrate 110. The vertical data line 112 disposed in the vertical space is formed on the first insulating film 111. The second insulating film 115 is formed on the vertical data line 112. The vertical scan line 119 disposed in the vertical space is formed on the second insulating film 115. The third insulating film 120 is formed on the vertical scan line 119. The transparent electrodes 122 which become the common electrode are formed to be separately disposed in the region of the sub-pixels on the third insulating film 120. The fourth insulating film 124 is formed on the transparent electrode 122. The shield electrode 125 disposed in the vertical space is formed on the fourth insulating film 124. The shield electrode 125 is connected to the line for supplying the common voltage, the ground voltage or the voltage between the positive and negative voltages. The pixel electrodes 126 are formed on the fourth insulating film 124.

The pixel electrodes 126 are separately disposed in the region of the n-1 and n sub-pixels PIXn-1 and PIXn. The pixel electrode 126 may be configured to be divided into a plurality of pixel electrodes so as to have a (<) shape in the transmission region as shown in FIG. 7. In this case, the n-1 vertical data line Dn-1 and n-1 vertical scan line VGn-1 and the n vertical data line Dn and n vertical scan line VGn may be wired so as to have the (<) shape. However, it is only an example and the shapes thereof are not limited thereto. Meanwhile, as the reference numeral 130 represents a black matrix formed on the upper substrate, a width of the vertical space may correspond to the width of the black matrix 130 in the vertical direction.

Further, in the fourth embodiment, the shield electrode 125 and the pixel electrode 126 are formed of the same transparent conductive film and are patterned, such that the two electrodes may be separated from each other, thereby making it possible to shield the signal interference between the vertical scan line and the pixel electrode without an additional process.

<Fifth Embodiment>

Figure 14:
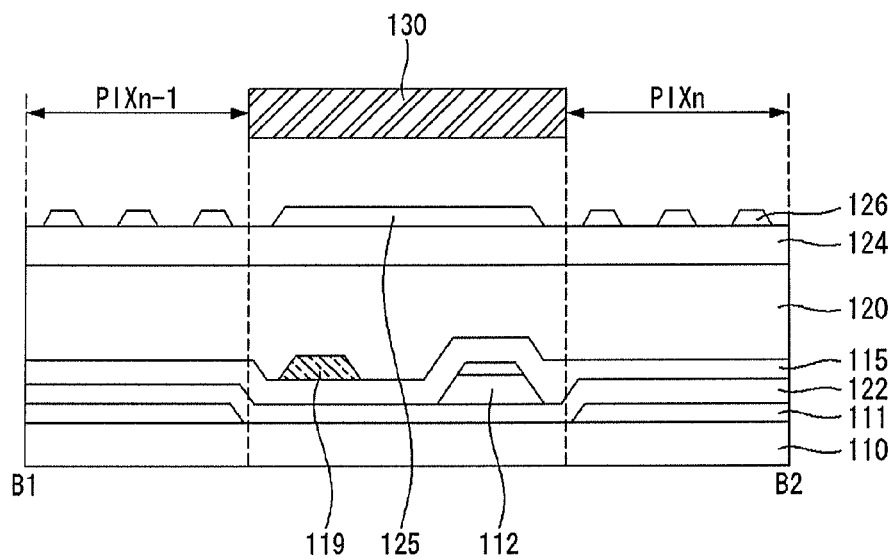
FIG. 14 is a cross-sectional view of a region taken along line B1-B2 illustrated in FIG. 7 according to a fifth embodiment of the present invention.

FIG. 14 is a cross-sectional view of a region taken along line B1-B2 illustrated in FIG. 7 according to a fifth embodiment of the present invention.

As shown in FIGS. 7 and 14, the transparent electrodes 122 which are separately disposed in the region of the n-1 and n sub-pixels PIXn-1 and PIXn to become the common electrode are formed on the lower substrate 110. The first insulating film 111 is formed on the transparent electrode 122. The vertical data line 112 disposed in the vertical space is formed on the first insulating film 111. The second insulating film 115 is formed on the vertical data line 112. The vertical scan line 119 disposed in the vertical space is formed on the second insulating film 115. The third insulating film 120 is formed on the vertical scan line 119. The fourth insulating film 124 is formed on the third insulating film 120. The shield electrode 125 disposed in the vertical space is formed on the fourth insulating film 124. The shield electrode 125 is connected to the line for supplying the common voltage, the ground voltage or the voltage between the positive and negative voltages. The pixel electrodes 126 are formed on the fourth insulating film 124.

The pixel electrodes 126 are separately disposed in the region of the n-1 and n sub-pixels PIXn-1 and PIXn. The pixel electrode 126 may be configured to be divided into a plurality of pixel electrodes so as to have a (<) shape in the transmission region as shown in FIG. 7. In this case, the n-1 vertical data line Dn-1 and n-1 vertical scan line VGn-1 and the n vertical data line Dn and n vertical scan line VGn may be wired so as to have the (<) shape. However, it is only an example and the shapes thereof are not limited thereto. Meanwhile, as the reference numeral 130 represents a black matrix formed on the upper substrate, a width of the vertical space may correspond to the width of the black matrix 130 in the vertical direction.

Further, in the fifth embodiment, the transparent electrode 122, which becomes the common electrode, and the shield electrode 125 are formed to be separated in layers different from each other. The structure is to apply the shield electrode 125 to the comparative example shown in FIG. 10A, the shield electrode 125 and the pixel electrode 126 are formed of the same transparent conductive film and are patterned, such that the two electrodes may be separated from each other, thereby making it possible to provide a convenience of process compared to the third embodiment.

As set forth above, at the time of manufacturing the liquid crystal display panel having the vertical scan line according to the embodiment of the present invention, the dim phenomenon that is generated in the vertical direction by the signal interference between the vertical scan line and the pixel electrode is improved or removed, thereby making it possible to implement the narrow bezel. In addition, the present invention can apply effectively to the liquid crystal display panel of various structures having the vertical scan line. In addition, even though the scan signal is overlapped and supplied, the present invention can maintain the shielding ability between the vertical scan line and the pixel electrode.

What is claimed is:

1. A display device, comprising:
    a display panel having vertical lines and horizontal lines formed thereon, wherein the display panel, including:
    a lower substrate;
    a first insulating film on the lower substrate;
    the vertical data line on the first insulating film and disposed in a vertical space vertically dividing a region between the sub-pixels;
    a second insulating film on the vertical data line;
    a third insulating film on the vertical scan line;
    a fourth insulating film on the common electrode; and
    the pixel electrode on the fourth insulating film and separately disposed in each region of the sub-pixels;
    the sub-pixels on the display panel including a pixel electrode and a common electrode; wherein:
    the vertical lines include the vertical data line to which the data signal is supplied and a vertical scan line to which the scan signal is supplied,
    the horizontal lines are connected to the vertical scan line and include a horizontal scan line transferring the scan signal in a horizontal direction, wherein the vertical scan line on the second insulating film and disposed in the vertical space;
    the display panel includes a shield electrode for shielding a signal interference between the pixel electrode and the vertical scan line, and
    wherein the shield electrode is on a layer provided between the pixel electrode and the horizontal scan line.

2. The display device of claim 1, wherein the vertical scan line is on a layer covering the vertical data line.

3. The display device of claim 1, wherein the shield electrode is connected to a line supplying a common-mode voltage, a ground voltage, or a voltage between a positive voltage and a negative voltage.

4. The display device of claim 1, wherein the display panel, including:
   a common electrode over entire surface of the third insulating film and connected integrally with the shield electrode.

5. The display device of claim 1, wherein the display panel, including:
   the shield electrode on the third insulating film and disposed in the vertical space;
   the common electrode on the third insulating film and separately disposed in each region of the sub-pixels;
   the fourth insulating film on the shield electrode.

6. The display device of claim 1, wherein the display panel, including:
   the common electrode on the lower substrate and separately disposed in each region of the sub-pixels;
   the vertical scan line on the second insulating film and disposed in the vertical space;
   the shield electrode on the third insulating film and disposed in the vertical space;
   the fourth insulating film on the shield electrode; and.

7. The display device of claim 1, wherein the display panel, including:
   the common electrode on the third insulating film and separately disposed in each region of the sub-pixels;
   the shield electrode on the fourth insulating film and disposed in the vertical space.

8. The display device of claim 1, wherein the display panel includes a contact holes for electrically connecting the vertical scan line to the horizontal scan line, the contact holes which are connected by a virtual line have a V-shape.

9. The display device of claim 1, wherein the shield electrode is disposed so as to corresponding to a region in which the vertical scan line is formed.

10. A display device, comprising:
   a display panel having vertical lines and horizontal lines formed thereon, wherein the display panel, including:
   a lower substrate;
   a first insulating film on the lower substrate;
   the vertical data line on the first insulating film and disposed in a vertical space vertically dividing a region between the sub-pixels;
   a second insulating film on the vertical data line;
   a third insulating film on the vertical scan line;
   a fourth insulating film on the common electrode; and
   the pixel electrode on the fourth insulating film and separately disposed in each region of the sub-pixels;
   the sub-pixels on the display panel including a pixel electrode and a common electrode; wherein:
   the vertical lines include the vertical data line to which the data signal is supplied and a vertical scan line to which the scan signal is supplied,
   the horizontal lines are connected to the vertical scan line and include a horizontal scan line transferring the scan signal in a horizontal direction, wherein the vertical scan line on the second insulating film and disposed in the vertical space;
   the display panel includes a shield electrode for shielding a signal interference between the pixel electrode and the vertical scan line, and
   the shield electrode is on a layer in which the pixel electrode is formed and separately disposed in each region of the sub-pixels.

11. The display device of claim 10, wherein the display panel, including:
   a common electrode over entire surface of the third insulating film and connected integrally with the shield electrode;
   the common electrode on the lower substrate and and separately disposed in each region of the sub-pixels.

12. The display device of claim 10, wherein the display panel includes a contact holes for electrically connecting the vertical scan line to the horizontal scan line, the contact holes which are connected by a virtual line have a V-shape.

13. The display device of claim 10, wherein the shield electrode is disposed so as to corresponding to a region in which the vertical scan line is formed.

* * * * *